(12) United States Patent
Chung et al.

(10) Patent No.: US 11,571,973 B2
(45) Date of Patent: Feb. 7, 2023

(54) METHOD FOR CONTROLLING ELECTRIC HAND TRUCK AND APPARATUS THEREFOR

(71) Applicant: NAVER LABS CORPORATION, Seongnam-si (KR)

(72) Inventors: Jinwon Chung, Seongnam-si (KR); Donghun Yu, Seongnam-si (KR); Joonho Seo, Seongnam-si (KR); Sangok Seok, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 393 days.

(21) Appl. No.: 16/791,625

(22) Filed: Feb. 14, 2020

(65) Prior Publication Data

US 2020/0180439 A1    Jun. 11, 2020

Related U.S. Application Data

(63) Continuation of application No. PCT/KR2018/006022, filed on May 28, 2018.

(30) Foreign Application Priority Data

Aug. 14, 2017    (KR) .................. 10-2017-0102896

(51) Int. Cl.
*B60L 15/20*        (2006.01)
*B62B 5/00*         (2006.01)
(Continued)

(52) U.S. Cl.
CPC ........ *B60L 15/2009* (2013.01); *B62B 5/0036* (2013.01); *B62B 5/04* (2013.01);
(Continued)

(58) Field of Classification Search
CPC ..... B60L 15/2009; B62B 5/0036; B62B 5/04; H02P 3/18
See application file for complete search history.

(56) References Cited

U.S. PATENT DOCUMENTS

2006/0096793 A1 * 5/2006 Akagi .............. H02K 7/14
                                                         180/65.1
2014/0246261 A1    9/2014 Sekine et al.
(Continued)

FOREIGN PATENT DOCUMENTS

EP         3153147 A1    4/2017
JP         2004359008 A  12/2004
(Continued)

OTHER PUBLICATIONS

Office Action issued by the Chinese Patent Office in corresponding Chinese patent application No. 201880050989.3, dated Sep. 29, 2021.
(Continued)

*Primary Examiner* — Brian L Swenson
(74) *Attorney, Agent, or Firm* — Greer Burns & Crain Ltd.

(57) ABSTRACT

A method for controlling an electric hand truck includes determining whether user manipulation is present due to a user input on the electric hand truck; and, if there is no user manipulation, then braking an electric motor that drives the wheels of the electric moving vehicle in a softlock manner in which, instead of power being applied to the electric motor, electrodes of the electric motor are short-circuited.

15 Claims, 9 Drawing Sheets

(51) Int. Cl.
*B62B 5/04* (2006.01)
*H02P 3/18* (2006.01)
(52) U.S. Cl.
CPC ......... *B60L 2200/36* (2013.01); *B62B 5/0053* (2013.01); *H02P 3/18* (2013.01)

(56) References Cited

U.S. PATENT DOCUMENTS

| | | | | |
|---|---|---|---|---|
| 2014/0265254 | A1* | 9/2014 | Sekine | B60L 1/003 280/638 |
| 2015/0066277 | A1* | 3/2015 | Kojina | B62B 5/0033 180/19.1 |
| 2018/0118245 | A1* | 5/2018 | Chung | B62B 5/0043 |
| 2021/0155278 | A1* | 5/2021 | Raja | B62B 5/0036 |

FOREIGN PATENT DOCUMENTS

| | | | |
|---|---|---|---|
| JP | 2014221086 | A | 11/2014 |
| JP | 2016185235 | A | 10/2016 |
| KR | 200303416 | Y1 | 1/2003 |
| KR | 200440927 | Y1 | 7/2008 |
| KR | 101502975 | B1 | 3/2015 |

OTHER PUBLICATIONS

ISR issued in Int'l. application No. PCT/KR2018/006022, mailed Oct. 4, 2018.
Office Action issued by the EPO in corresponding European patent application No. 18188649.0, dated Mar. 4, 2021.

\* cited by examiner

METHOD FOR CONTROLLING ELECTRIC HAND TRUCK AND APPARATUS THEREFOR

CROSS-REFERENCE TO RELATED APPLICATIONS

This is a continuation application of International Application No. PCT/KR2018/006022 filed May 28, 2018, which claims benefit of Korean Patent Application No. 10-2017-0102896, filed Aug. 14, 2017.

BACKGROUND OF THE INVENTION

Field of Invention

Example embodiments of the following description relate to technology for stopping of a moving vehicle.

Description of Related Art

Currently, in many cases, goods are carried using a moving vehicle for various purposes, such as in shopping malls, delivery services, industrial fields, and the like.

For example, a structure of a transport carriage used to move parcel boxes and the like at a short distance from a warehouse or a distribution center is described in Korean Registered Utility Model Publication No. 20-0440927 (registered on Jul. 2, 2008).

If heavy goods are loaded on a moving vehicle, a user may need to apply a significant amount of force to move the moving vehicle. Further, it is more difficult for the user to move the moving vehicle on which goods are load in a direction desired by the user by appropriately controlling the moving vehicle. Accordingly, there is a great difficulty in transporting goods.

Accordingly, proposed is a method of moving a moving vehicle by including a motor in the moving vehicle and driving the motor.

BRIEF SUMMARY OF THE INVENTION

One or more example embodiments provide a safety control method and apparatus that may improve the energy efficiency of a brake for stopping a moving vehicle when a user manipulation is absent.

According to at least one example embodiment, there is provided a method of controlling the safety of an electric moving vehicle, the method including determining whether a user manipulation is present based on the presence or the absence of a user input for the electric moving vehicle; and braking using a softlock method of shorting electrodes of an electric motor without applying power to the electric motor that drives wheels of the electric moving vehicle when the user manipulation is absent.

According to an aspect of the present invention, the softlock method may use a short brake phenomenon in which a brake of a constant force is applied with a counter electromotive force generated by shorting the electrodes of the electric motor.

According to another aspect, the braking may include initially applying the softlock method to the electric motor when the user manipulation is absent; and applying a hardlock method of forcefully braking the electric motor by applying power required to brake the electric motor, in response to a movement of the electric moving vehicle in a state in which the user manipulation is absent during applying the softlock method.

According to still another aspect, the braking may include determining whether the electric moving vehicle is positioned on a flat surface or on a slope based on a gradient of the electric moving vehicle, when the user manipulation is absent; applying the softlock method to the electric motor when the electric moving vehicle is positioned on the flat surface; and applying a hardlock method of forcefully braking the electric motor by applying power required to brake the electric motor when the electric moving vehicle is positioned on a slope.

According to still another aspect, the hardlock method may control a driving speed of the electric motor to become zero by constructing a feedback loop.

According to still another aspect, the determining may include determining whether the user manipulation is present by measuring a magnitude of a force that is applied to the electric moving vehicle.

According to still another aspect, the electric moving vehicle may be configured as a moving device having a structure which enables a person to be aboard.

According to at least one example embodiment, there is provided a method of controlling the safety of an electric moving vehicle, the method including determining whether a user manipulation is present based on a presence or an absence of a user input for the electric moving vehicle; and braking using a softlock method of shorting electrodes of an electric motor without applying power to the electric motor that drives the wheels of the electric moving vehicle when the user manipulation is absent; and applying a hardlock method of forcefully braking the electric motor by applying power required to brake the electric motor, in response to a movement of the electric moving vehicle in a state in which the user manipulation is absent during applying the softlock method.

According to at least one example embodiment, there is provided a method of controlling the safety of an electric moving vehicle, the method including determining whether a user manipulation is present based on a presence or an absence of a user input for the electric moving vehicle; and determining whether the electric moving vehicle is positioned on a flat surface or on a slope based on a gradient of the electric moving vehicle, when the user manipulation is absent; applying a softlock method of shorting electrodes of an electric motor without applying power to the electric motor that drives wheels of the electric moving vehicle when the electric moving vehicle is positioned on the flat surface; and applying a hardlock method of forcefully braking the electric motor by applying power required to brake the electric motor when the electric moving vehicle is positioned on the slope.

According to at least one example embodiment, there is provided a computer program recorded in a non-transitory computer-readable recording medium to implement a safety control method of an electric moving vehicle in conjunction with a computer system. Here, the safety control method includes determining whether a user manipulation is present based on a presence or an absence of a user input for the electric moving vehicle; and braking using a softlock method of shorting electrodes of an electric motor without applying power to the electric motor that drives wheels of the electric moving vehicle when the user manipulation is absent According to at least one example embodiment, there is provided a safety control apparatus of an electric moving vehicle, the safety control apparatus including a manipulation detector configured to detect whether a user manipulation is present based on a presence or an absence of a user input for the electric moving vehicle; and a controller configured to brake using a softlock method of shorting electrodes of an electric motor without applying power to the electric motor that drives wheels of the electric moving vehicle when the user manipulation is absent.

According to some example embodiments, it is possible to improve energy efficiency of a moving vehicle by effectively controlling the amount of power used for a brake for stopping the moving vehicle when a user manipulation is absent.

DETAILED DESCRIPTION OF THE INVENTION

Hereinafter, example embodiments will be described with reference to the accompanying drawings.

The example embodiments relate to a safety control method and apparatus that may improve energy efficiency of an electric moving vehicle.

The example embodiments including disclosures herein may achieve many advantages in terms of an energy efficiency and a cost reduction of an electric moving vehicle.

Herein, the term "electric moving vehicle" may inclusively refer to a moving device in a structure in which a person is boardable and, if the electric moving vehicle is used for a person to board, may include, for example, an electric wheelchair, an electric moving bed, an electric stroller, an electric wagon, and the like. Hereinafter, although description is made using a goods transportation device as a representative example of the electric moving vehicle, it is provided as an example only.

Figure 1:
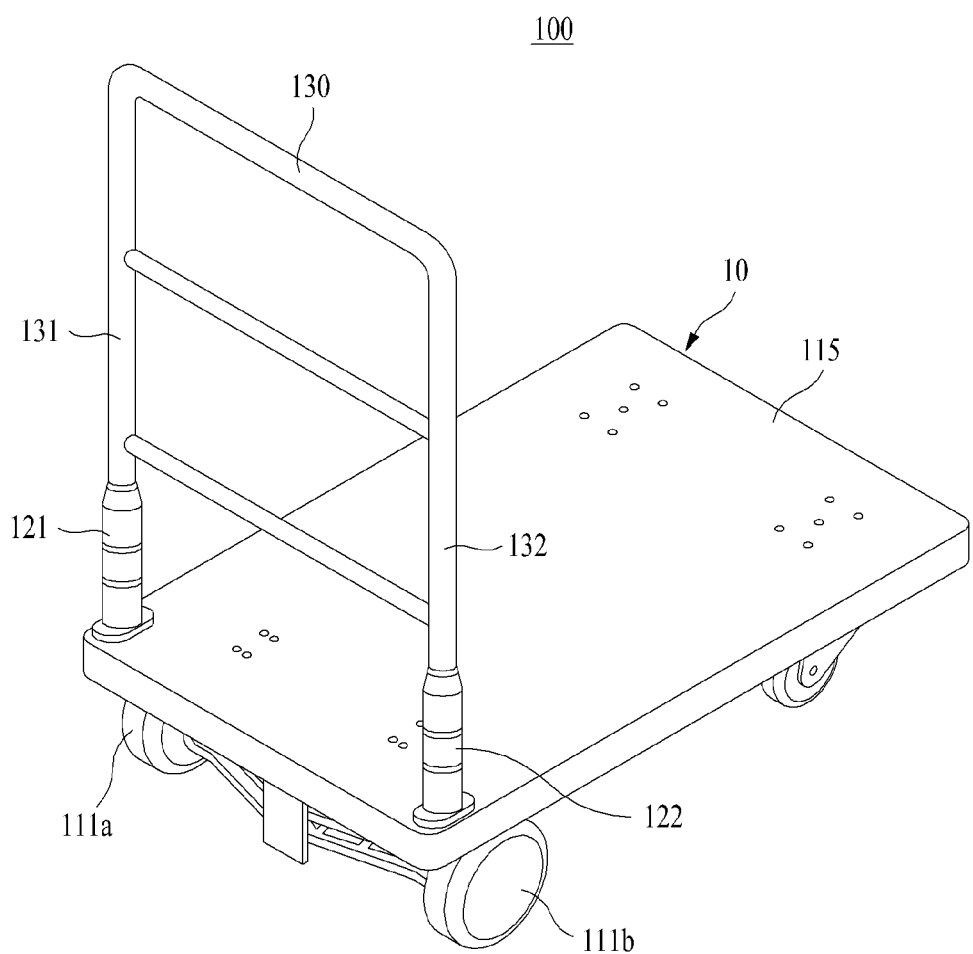
FIG. 1 is a perspective view of an electric moving vehicle according to an example embodiment.
Figure 2:
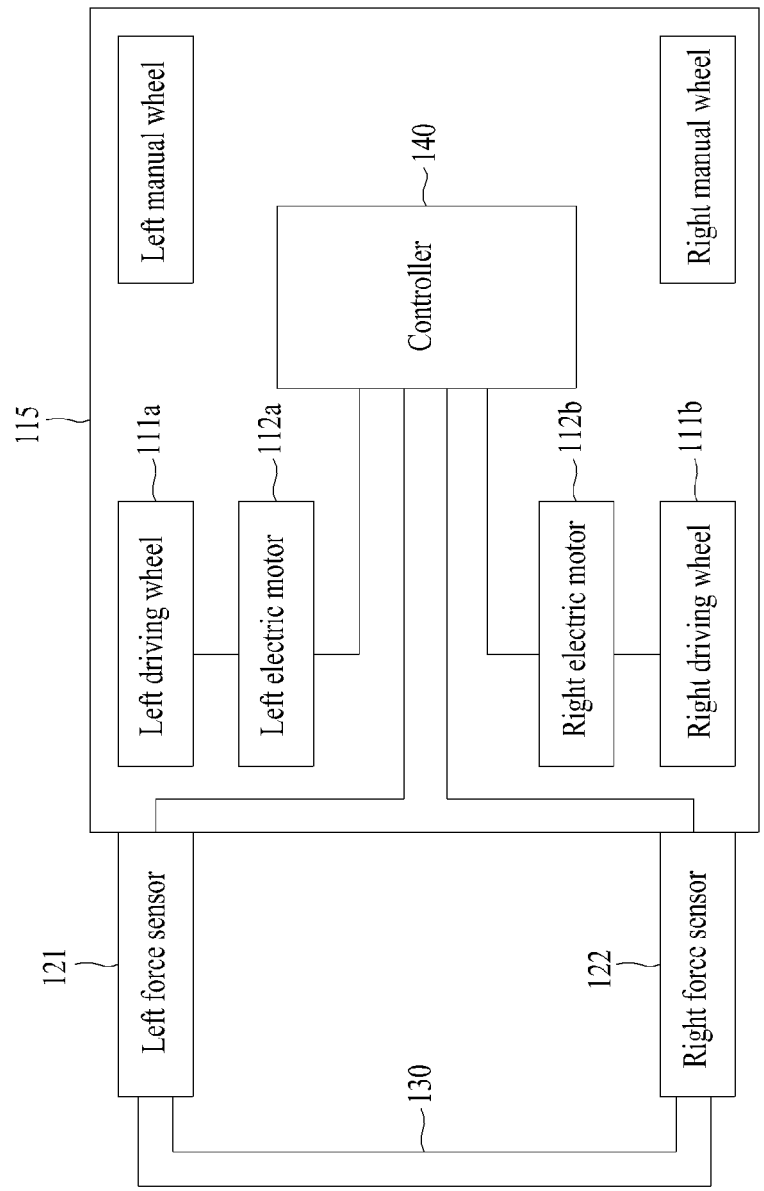
FIG. 2 is a diagram illustrating a configuration of an electric moving vehicle according to an example embodiment.

FIG. 1 is a perspective view of an electric moving vehicle according to an example embodiment, and FIG. 2 is a block diagram illustrating a configuration of an electric moving vehicle according to an example embodiment.

Hereinafter, an electric moving vehicle 100 according to an example embodiment is described with reference to FIGS. 1 and 2.

The electric moving vehicle 100 is configured to be load with and move goods to be transported, and includes a pair of driving wheels 111a and 111b that are arranged on the left and on the right, respectively, a pair of electric motors 112a and 112b configured to drive the driving wheels 111a and 111b, respectively, and a body 10 including a board 115 configured to be loaded with goods to be transported.

The electric moving vehicle 100 includes a handle 130 provided on one side of the body 10, a pair of force sensors 121 and 122 respectively provided on the left and the right side of the body 10 between a lower portion of left and right ends 131, 132 of the handle 130 and an upper portion of the board 115 and configured to sense a force that is transmitted from a user to the body 10 through the handle 130, and a controller 140 configured to control driving of the electric motors 112a and 112b based on the force transmitted to the body 10.

Although not illustrated here, the electric moving vehicle 100 generally includes a rechargeable battery. Here, the battery may supply power required for the electric moving vehicle 100 in addition to driving the electric motors 112a and 112b under control of the controller 140.

According to the aforementioned configuration, the electric moving vehicle 100 may conveniently transport desired goods to a desired place in such manner that the goods desired to transport are loaded on the board 115 of the body 10 and the driving wheels 111a and 111b are driven by the electric motors 112a and 112b.

In the electric moving vehicle 100, the handle 130 grabbable by the user may be provided on one side of the body 10. Accordingly, the user may apply a force in a direction in which the goods are to be transported, by grabbing the handle 130 of the electric moving vehicle 100.

In the electric moving vehicle 100, the force sensors 121 and 122 may be respectively provided on the left and the right side of the body 10 between the left and right ends 131, 132 of the handle 130 and the body 10. Each of the force sensors 121 and 122 may sense a force that is applied by the user to the handle 130 and then transmitted to the body 10. Here, the force sensors 121 and 122 may include a load cell. In addition, various types of sensors capable of measuring a magnitude of applied force, such as a strain gauge, may also be used.

Referring to FIG. 1, the force sensors 121 and 122 may be respectively provided on the left side and the right side of an upper side of the board 115 on which the goods to be transported are loaded. Accordingly, the force sensors 121 and 122 may accurately and effectively sense the force that is applied by the user to the handle 130 and transmitted to the body 10.

In the present invention, instead of providing a pair of force sensors 121 and 122 at an upper end of the handle 130 in the electric moving vehicle 100, the force sensors 121 and 122 are provided between the left and right ends 131, 132 of the handle 130 and the board 115 in the electric moving vehicle. Therefore, the user may grab not a preset position of the handle 130 but a position of the handle 130 convenient for the user and may manipulate the electric moving vehicle 100.

In detail, the force sensors 121 and 122 may include a left force sensor 121 configured to sense a force that is transmitted to the left end 131 of the handle 130 from the force applied by the user and a right force sensor 122 configured to sense a force that is transmitted to the right end 132 of the handle 130 from the force applied by the user. In this manner, the pair of force sensors 121 and 122 may be provided in a path through which the force applied by the user is transmitted in the electric moving vehicle 100 and may sense the force applied by the user. Accordingly, although the user uses even a single hand without a need to use both hands, the pair of force sensors 121 and 122 may sense the force applied by the user and may easily control the electric moving vehicle 100.

Hereinafter, an operation of the force sensors 121 and 122 is described with reference to FIG. 3.

Figure 3:
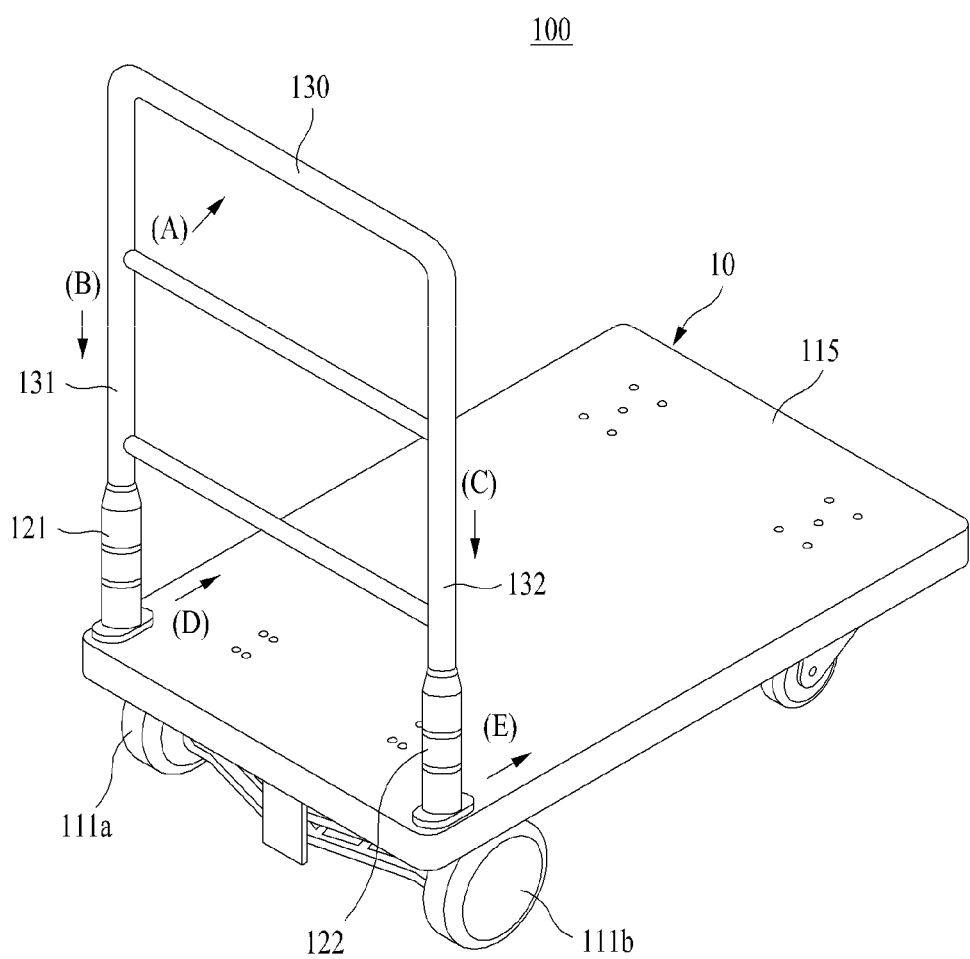
FIG. 3 is a perspective view of an electric moving vehicle to describe a process of transmitting a force applied by a user in the electric moving vehicle according to an example embodiment.

When the user applies a force in a direction in which the user desires to transport the loaded goods, grabbing the handle 130 with one hand or both hands (direction (A) of FIG. 3), a portion of the force applied by the user is applied to the left side of the body 10 (direction (D) of FIG. 3) through the left end 131 of the handle 130 and the left force sensor 121 (direction (B) of FIG. 3). Also, a portion of the force applied by the user is applied to the right side of the body 10 (direction (E) of FIG. 3) through the right end 132 of the handle 130 and the right force sensor 122 (direction (C) of FIG. 3).

The electric moving vehicle 100 according to an example embodiment may control an operation of the electric motors 112a and 112b to amplify the magnitude of the force transmitted to the body 10 and to drive the electric moving vehicle 100 while maintaining the driving direction of the electric moving vehicle 100 by the force that is applied by the user to the handle 130 and then transmitted to the body 10. Accordingly, although heavy goods are loaded, the user may easily manipulate the electric moving vehicle 100 to move to a desired place.

The electric moving vehicle 100 may include the controller 140 configured to control driving of the electric motors 112a and 112b based on sensing data generated at the force sensors 121 and 122. In general, although the controller 140 may be provided on the body 10, it is provided as an example only. For example, the controller 140 may be provided on the handle 130 and may be provided at any position that allows an operation of the controller 140 to appropriately performed.

The controller 140 may control the electric motors 112a and 112b by amplifying the magnitude of the force that is transmitted to the body 10 while maintaining the driving direction of the electric moving vehicle 100 by the force that is applied by the user to the handle 130 and then transmitted to the body 10. The electric moving vehicle 100 may use a brushless direct current (BLDC) motor for the electric motors 112a, 112b. In addition, any motor capable of being controlled by the controller 140 to appropriately drive the electric moving vehicle 100 may be applied without being particularly limited.

The controller 140 may control current applied to the electric motors 112a and 112b based on sensing data that is generated by the force sensors 121 and 122, such that the user may intuitively and easily control a movement of the electric moving vehicle 100. Here, when the controller 140 performs a current control in controlling the driving of the electric motors 112a and 112b, torque (i.e., rotational power) of the electric motors 112a and 112b may be generated to be proportional to the current applied to the electric motors 112a and 112b. Accordingly, the user may easily move the electric moving vehicle 100 even with a small force. The controller 140 may use a pulse width modulation (PWM) signal having various duties to control the current that is applied to the electric motors 112a and 112b. That is, since the controller 140 of the electric moving vehicle 100 uses a PWM signal, the controller 140 may effectively control the current that is applied to the electric motors 112a and 112b.

Figure 4:
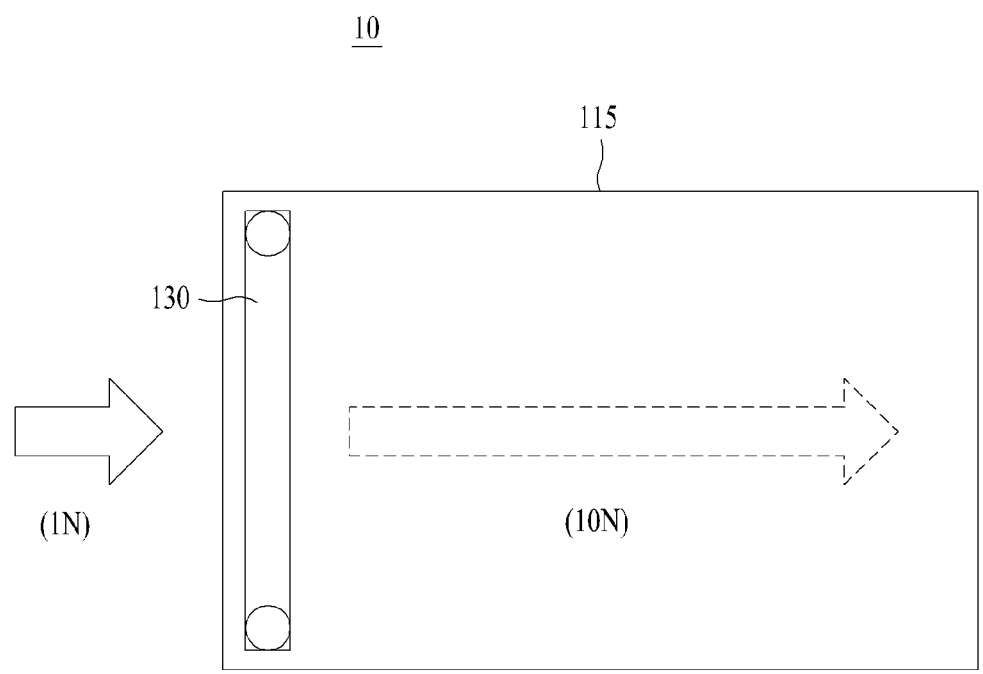
FIGS. 4 to 6 illustrate examples of a process of driving an electric moving vehicle based on a force applied by a user according to an example embodiment.
Figure 5:
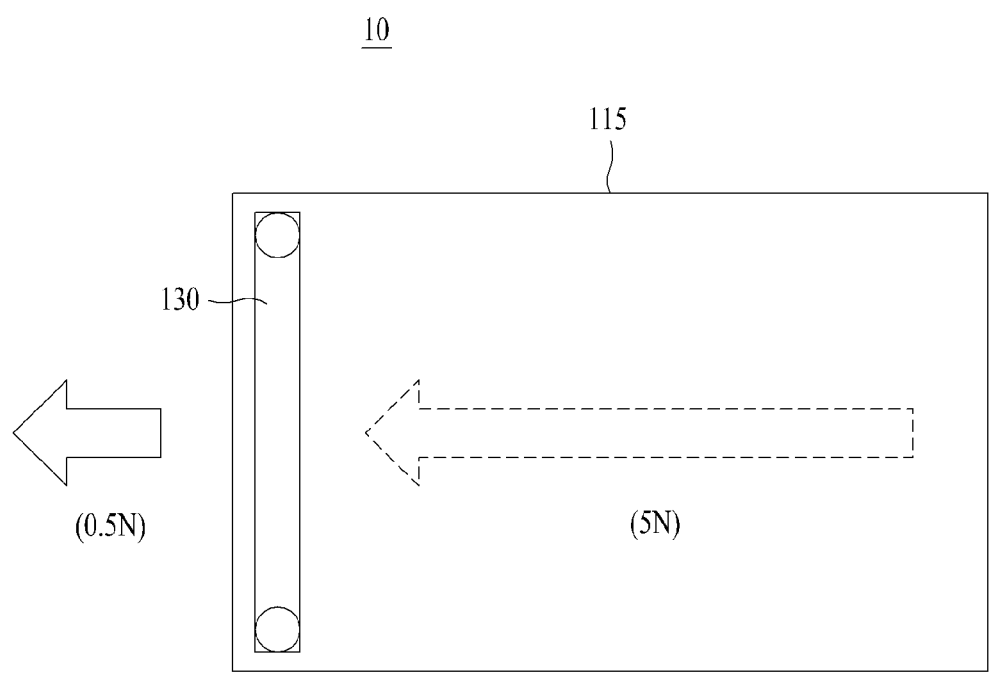
Figure 6:
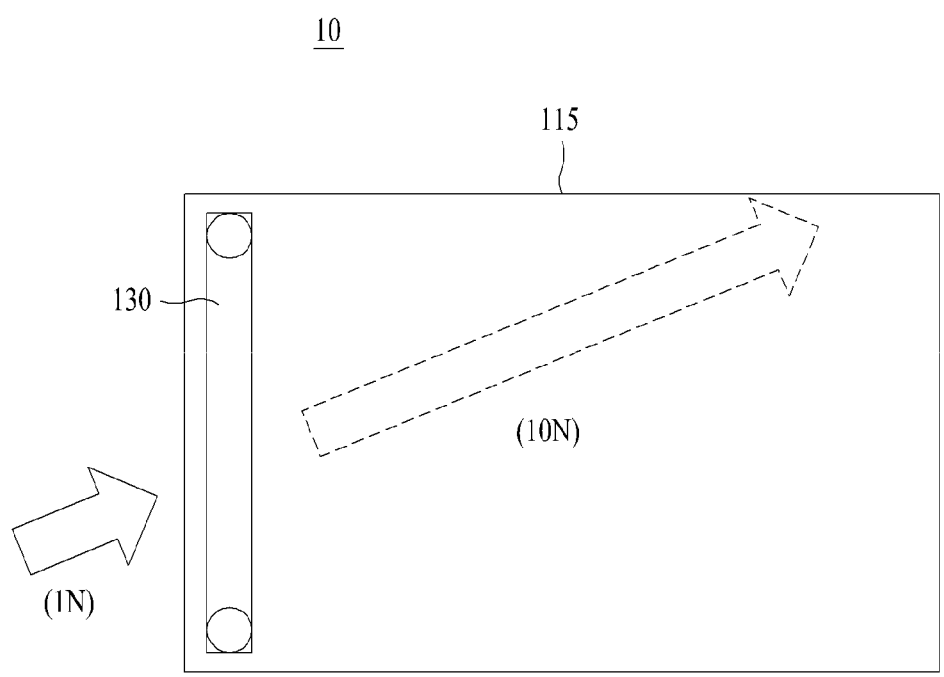

FIGS. 4 to 6 illustrate examples of a process of driving the electric moving vehicle 100 based on a force applied by a user according to an example embodiment.

Referring to FIG. 4, when the user vertically applies a force to the handle 130 to make the electric moving vehicle 100 move forward (applies a force of 1 N in FIG. 4), the force applied by the user is divided into a half and accordingly, a half of the force applied by the user is applied to the left side of the body 10 through the left end 131 of the handle 130 and the left force sensor 121. Also, the other half of the force applied by the user is applied to the right side of the body 10 through the right end 132 of the handle 130 and the right force sensor 122. Here, each of the left force sensor 121 and the right force sensor 122 senses a force of 0.5 N and, in response thereto, the controller 140 amplifies the magnitude of the force transmitted to the body 10 (e.g., amplifies the force of 1 N to 10 N in FIG. 4) and controls the current applied to the left electric motor 112a and the right electric motor 112b while maintaining a driving direction of the electric moving vehicle 100 based on the force (each 0.5 N) sensed by the left force sensor 121 and the right force sensor 122. Accordingly, in FIG. 4, the current with the same magnitude may be applied to each of the left electric motor 112a and the right electric motor 112b.

Referring to FIG. 5, when the user applies a force in a direction of pulling the handle 130 to make the electric moving vehicle 100 move backward (applies a force of 0.5 N in FIG. 5), each of the left force sensor 121 and the right force sensor 122 senses a force of 0.25 N and, in response thereto, the controller 140 amplifies a magnitude of the force transmitted to the body 10 (e.g., amplifies the force of 0.5 N to 5 N in FIG. 5) and controls the current applied to the left electric motor 112a and the right electric motor 112b while maintaining a driving direction of the electric moving vehicle 100 based on the force (each 0.25 N) sensed by the left force sensor 121 and the right force sensor 122.

Herein, to drive the electric moving vehicle 100 by amplifying the force applied by the user, the force may not be amplified based on a predetermined amplification ratio. That is, the force applied by the user may be amplified using various methods, for example, varying the amplification ratio based on an input force or driving the electric moving vehicle 100 based on a predetermined magnitude of force.

Further, referring to FIG. 6, although the user applies a force in a forward and backward directions simultaneously and an inclined direction in the electric moving vehicle 100, the controller 140 may control the operation of the electric motors 112a and 112b by amplifying the magnitude of the force while maintaining a driving direction of the electric moving vehicle 100 by the force applied by the user and transmitted to the body 10. Accordingly, the user may turn the electric moving vehicle 100 in a desired direction or may move the electric moving vehicle 100 in an intended direction.

In detail, when the user applies a force to the handle 130 in a predetermined direction (applies a force of 1 N in FIG. 6), the force applied by the user is divided based on a predetermined ratio according to a corresponding direction and a portion of the force is applied to the left side of the body 10 through the left end 131 of the handle 130 and the left force sensor 121 and a remaining force is applied to the right side of the body 10 through the right end 132 of the handle 130 and the right force sensor 122. Here, if the left force sensor 121 senses a force of a[N] and the right force sensor 122 senses a force of b[N], the controller 140 controls the current applied to the left electric motor 112a and the right electric motor 112b based on the force sensed by the left force sensor 121 and the right force sensor 122.

For example, the controller 140 may control the current of the left electric motor 112a and the right electric motor 112b to perform amplification such that a force of 10a[N] may be generated in the left driving wheel 111a and a force of 10b[N] may be generated in the right driving wheel 111b. Accordingly, while maintaining a driving direction of the electric moving vehicle 100 by the force that is applied by the user and transmitted to the body 10, the controller 140 may amplify the magnitude of the force to 10 N, such that the user may turn the electric moving vehicle 100 in a desired direction or may move the electric moving vehicle 100 in an intended direction.

The aforementioned electric moving vehicle 100 is provided as an example only. Without being limited thereto, any moving vehicle operating with a battery may be included in an application target of the present disclosure.

Hereinafter, a safety control method and apparatus of an electric moving vehicle according to example embodiments is described.

Figure 7:
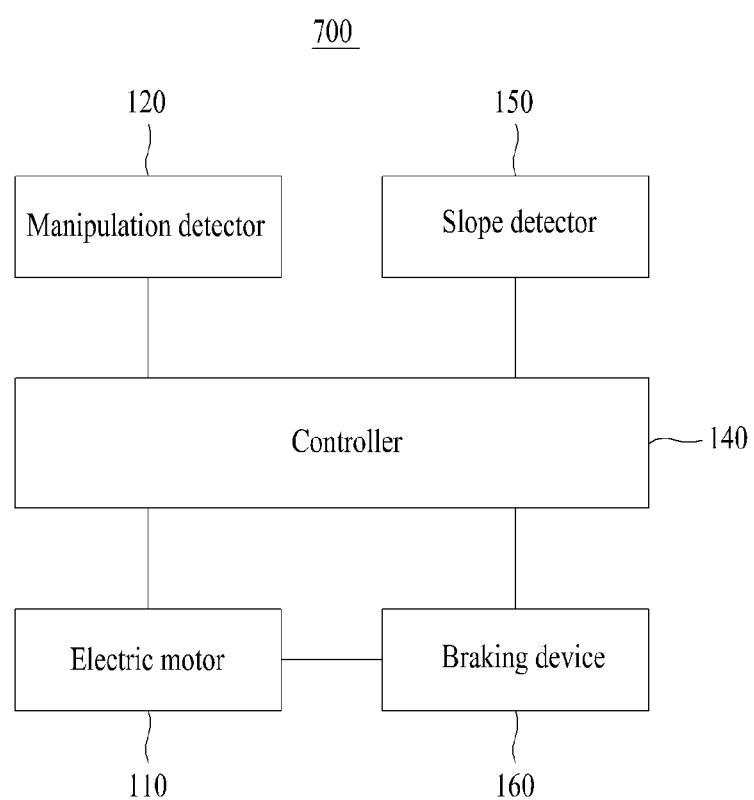
FIG. 7 is a diagram illustrating an example of a component includable in a safety control apparatus according to an example embodiment.

FIG. 7 is a diagram illustrating an example of components includable in a safety control apparatus according to an example embodiment.

When an electric moving vehicle is not manipulated by a person, the electric moving vehicle requires an automatic braking according to a position control or a speed control. FIG. 7 illustrates a safety control apparatus 700 for automatic braking of the electric moving vehicle 100. The safety control apparatus 700 may be included in the electric moving vehicle 100.

Referring to FIG. 7, the safety control apparatus 700 may include a manipulation detector 120, a slope detector 150, the controller 140, an electric motor 110, and a braking device 160. Depending on example, components of the safety control apparatus 700 may be selectively included in or excluded from the safety control apparatus 700.

The manipulation detector 120 functions to detect whether a user manipulation is present based on the presence or the absence of a user input to the electric moving vehicle 100. For example, the manipulation detector 120 may include a loadcell or a strain gauge and may measure a magnitude of a force applied to the electric moving vehicle 100 using such a sensor and may detect whether the user manipulation is present based on the presence or the absence of the user input. Here, the manipulation detector 120 may correspond to or implemented using the force sensors 121 and 122 of FIGS. 1 and 2. As another example, the manipulation detector 120 may be configured as a component separate from the force sensors 121 and 122 of FIGS. 1 and 2. For example, the manipulation detector 120 may be configured by providing a touch sensor and the like on a handle of the electric moving vehicle and may detect whether the user manipulation according to the presence or the absence of the user input is present based on touch sensing data about the handle.

The slope detector 150 functions to detect whether the electric moving vehicle is positioned on a slope. Here, the slope detector 150 may include an inertial sensor attached, for example, on the underside of the board 115. Various sensors capable of sensing a change in a gradient of a vehicle body, such as, for example, an acceleration sensor, a gravity sensor, a gyroscope, and a geomagnetic sensor, may be used. The slope detector 150 may detect a gradient from a reference axis pointing in a direction of gravity and may determine whether the electric moving vehicle 100 is positioned on a flat surface or on a slope.

The controller 140 corresponds to the controller 140 of FIGS. 1 and 2, and the electric motor 110 corresponds to the electric motors 112a and 112b of FIGS. 1 and 2. The controller 140 functions to control driving of the electric motor 110 based on a force that is transmitted from the user to the electric moving vehicle 100, and, particularly, may control braking or stopping of the electric motor 110 when the user does not manipulate the electric moving vehicle 100.

Here, the controller 140 may function as a processor that performs basic arithmetic, logic, and input/output operations, and may be configured to process instructions of a computer program. An instruction may be provided to the controller 140 by a memory included as a component of the electric moving vehicle 100. For example, the controller 140 may be configured to execute an instruction received in response to a program code stored in a storage device such as the memory. The controller 140 may include dedicated functional units or modules for performing their respective functions as instructed by the program code stored in the memory, or the controller 140 may perform all the different functions as a single unit.

The braking device 160 refers to a device that stops the driving of the electric motor 110 and may apply a softlock or a hardlock to the electric motor 110 under the control of the controller 140. Here, the softlock refers to a first stage of braking that applies a weak brake in a state in which a power consumption is not required and the hardlock refers to a second stage of braking that applies a brake with a strong force through a power consumption. For example, the softlock may apply a brake by shorting a driving circuit of the electric motor 110 without supplying power to the electric motor 110. For example, if a BLDC motor is used for the electric motor 110, a short brake phenomenon in which the driving of wheels (the driving wheels 111a and 111b of FIGS. 1 and 2) connected to the motor 110 is stopped with a predetermined force in response to generation of a counter electromotive force by shorting three electrodes (3 phase UVW) of the BLDC motor occurs. Here, the short brake phenomenon refers to contents described in http://forums.parallax.com/discussion/157445/how-would-you-short-3-wires-of-a-bldc-motor-together. Also, the hardlock stops driving of wheels (the driving wheels 111a and 111b of FIGS. 1 and 2) connected to the electric motor 110 with a forceful force by supplying power to the electric motor 110. For example, the braking device 160 may control the driving speed of the electric motor 110 to become zero through energy consumption by configuring a feedback loop. As another example, the braking device 160 for the hardlock may include a braking member combined with a braking liner configured to contact with or disconnect from a braking drum that is provided on a power transmission shaft that is shaft-connected to the electric motor 110 that supplies power for driving wheels of the electric moving vehicle. It is provided as an example only. Any braking mechanisms that stop wheels of the electric moving vehicle with a forceful force by supplying power to the electric motor 110 may be applied.

According to other example embodiments, the safety control apparatus 700 may include more number of components than the number of components of FIG. 7. The safety control apparatus 700 may further include an I/O device. For example, the input device of the I/O device may include a keyword, a mouse, and the like, and the output device of the I/O device may include a display. As another example, the I/O device may be a device for interfacing with an apparatus in which functions for input and output are integrated into a single function, such as a touchscreen. However, there is no need to clearly illustrate many conventional components.

Figure 8:
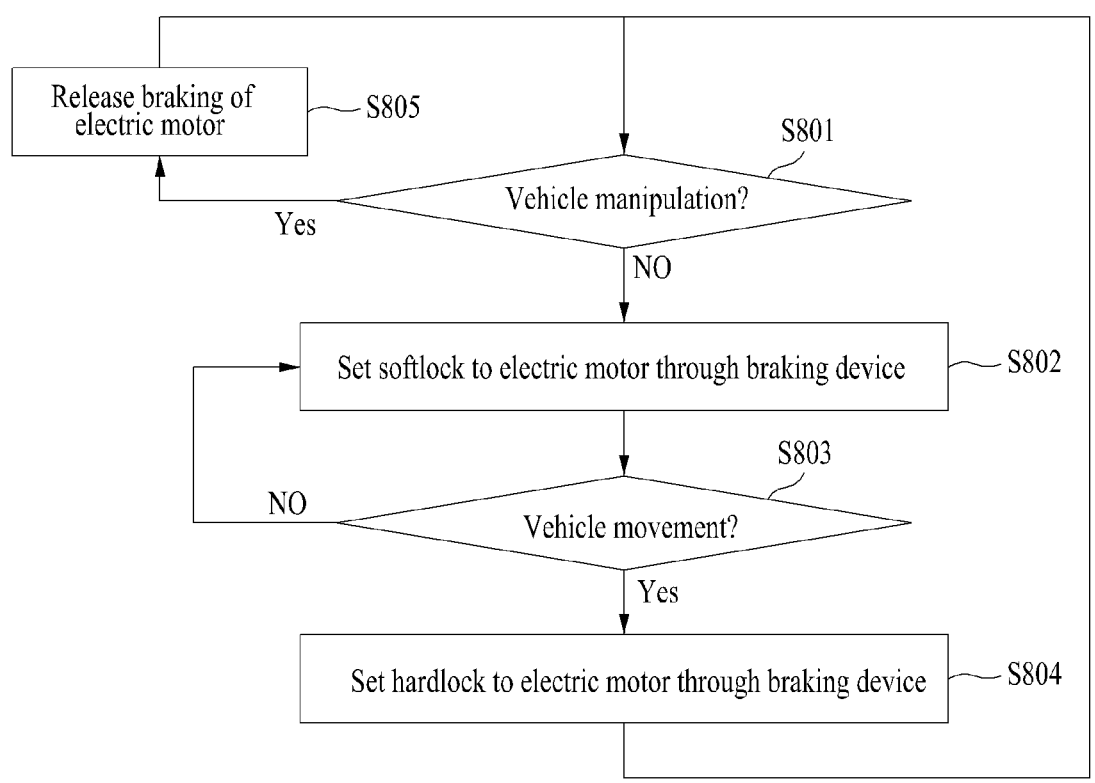
FIG. 8 is a flowchart illustrating an example of a safety control method performed by a safety control apparatus according to an example embodiment.

FIG. 8 is a flowchart illustrating an example of a safety control method performed by the safety control apparatus 700 according to an example embodiment. The safety control method may be performed by the controller 140 of the safety control apparatus.

Referring to FIG. 8, in operation S801, the controller 140 may determine whether a user manipulation for an electric moving vehicle 100 is present through the manipulation detector 120. That is, the controller 140 may determine whether the user is currently manipulating the electric moving vehicle 100 by grabbing the handle 130 of the electric moving vehicle.

In operation S802, when the user is not manipulating the electric moving vehicle 100, the controller 140 may initially set a softlock to the electric motor 110 through the braking device 160. Here, the braking device 160 may apply a brake to the electric moving vehicle 100 with a predetermined force by a short brake phenomenon by shorting the driving circuit of the electric motor 110 instead of applying current to the electric motor 110.

In operation S803, the controller 140 may determine whether the electric moving vehicle moves after setting the softlock. In a state in which a user manipulation is continuously absent during applying of the softlock, the controller 140 may determine whether the electric moving vehicle 100 moves based on a change in a wheel movement or the position of the electric moving vehicle 100.

In operation S804, when the electric moving vehicle 100 moves regardless of the softlock, the controller 140 may set a hardlock to the electric motor 110 through the braking device 160. Here, the braking device 160 may apply a brake by supplying the electric motor 110 with power required for braking and may by configuring a feedback loop in which a driving speed of the electric motor 110 becomes zero. Alternatively, the braking device 160 may stop the driving of wheels connected to the electric motor 110 with a forceful force through driving of a braking member.

Referring back to operation S801, when the user manipulates the electric moving vehicle 100, the controller 140 may release braking of the electric motor 110 by releasing the softlock or the hardlock through the braking device 160, in operation S805.

Accordingly, when the user does not manipulate the electric moving vehicle 100, the safety control apparatus 700 may initially apply the softlock and, if the electric moving vehicle still moves after the softlock, then apply the hardlock.

Figure 9:
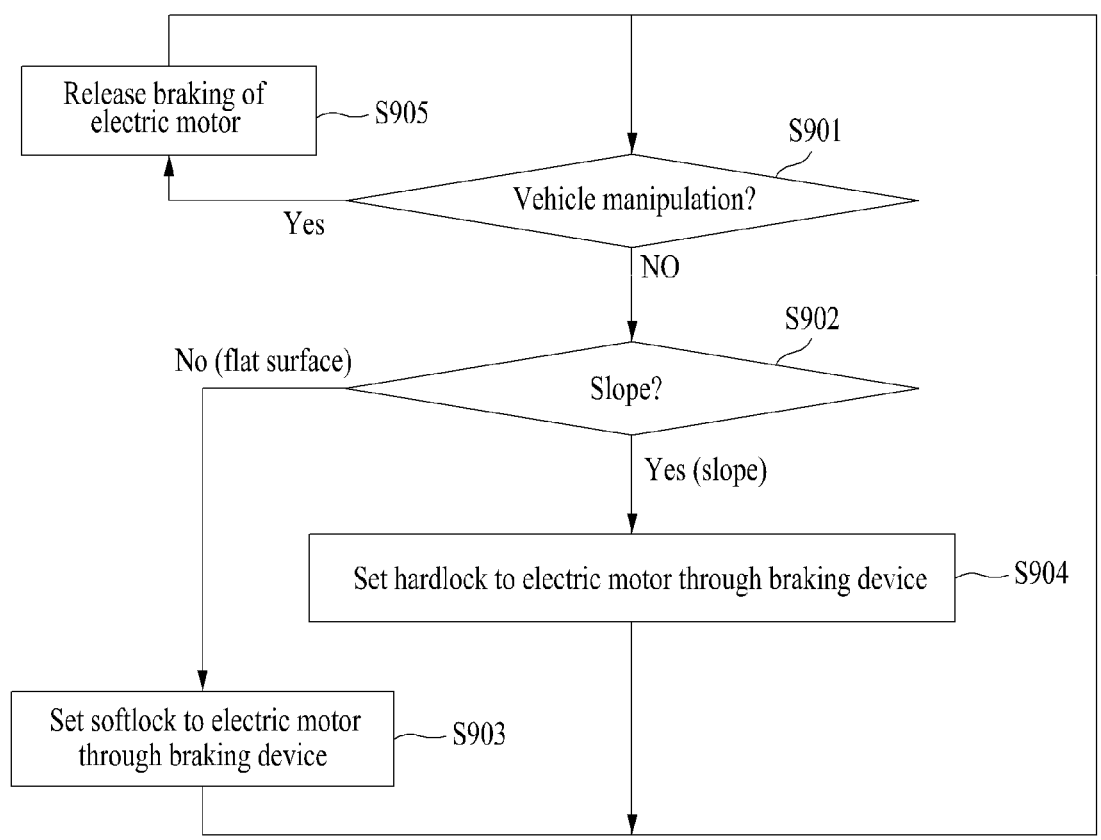
FIG. 9 is a flowchart illustrating another example of a safety control method performed by a safety control apparatus according to an example embodiment.

FIG. 9 is a flowchart illustrating another example of a safety control method performed by a safety control apparatus 700 according to an example embodiment.

Referring to FIG. 9, in operation S901, the controller 140 may determine whether a user manipulation of the electric moving vehicle 100 is present through the manipulation detector 120. That is, the controller 140 may determine whether the user is currently manipulating the electric moving vehicle 100 by grabbing the handle 130 of the electric moving vehicle.

In operation S902, when the user is not manipulating the electric moving vehicle 100, the controller 140 may detect whether the electric moving vehicle is positioned on a slope through the slope detector 150. In a state in which the user does not manipulate the electric moving vehicle 100, the controller 140 may determine whether the electric moving vehicle is positioned on a flat surface or on a slope.

In operation S903, when the electric moving vehicle is positioned on the flat surface, the controller 140 may set a softlock to the electric motor 110 through the braking device 160. Here, the braking device 160 may apply a brake to the electric moving vehicle 100 with a predetermined force by a short brake phenomenon of the electric motor 110 by shorting the driving circuit of the electric motor 110 instead of applying current to the electric motor 110.

In operation S904, when the electric moving vehicle 100 is positioned on the slope, the controller 140 may set a hardlock to the electric motor 110 through the braking device 160. Here, the braking device 160 may apply a brake by supplying the electric motor 110 with power required for braking and by configuring a feedback loop in which a driving speed of the electric motor 110 becomes zero. Alternatively, the braking device 160 may stop driving of wheels connected to the electric motor 110 with a forceful force through driving of the braking member.

Referring back to operation S901, when the user manipulates the electric moving vehicle 100, the controller 140 may release braking of the electric motor 110 by releasing the softlock or the hardlock through the braking device 160, in operation S905.

Accordingly, when the user does not manipulate the electric moving vehicle 100, the safety control apparatus may apply a brake on the electric moving vehicle by applying the softlock when the electric moving vehicle is on a flat surface and by applying the hardlock when on the slope.

As described above, when the user does not manipulate the electric moving vehicle 100, the safety control apparatus 700 may apply an automatic brake to the electric moving vehicle. Here, a sequential braking method of initially applying the softlock and then applying the hardlock when the electric moving vehicle 100 still moves without considering whether the electric moving vehicle is provided on a flat surface or on a slope, or a selective braking method of applying the softlock on the flat surface and applying the hardlock on the slope, may be applied. In a situation in which the electric moving vehicle 100 may be braked only with the softlock (e.g., flat surface), a power supply for braking is not required and accordingly, the amount of power consumed by the electric moving vehicle 100 may be reduced.

According to some example embodiments, when a user does not manipulate a moving vehicle, the energy efficiency of the moving vehicle may be improved by effectively controlling the amount of power used by a brake for stopping the moving vehicle.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. Here, the media may continuously store or may temporarily store computer-executable programs for execution or download. Also, the media may be various recording devices or storage devices in a form in which a single piece of or a plurality of pieces of hardware are combined and may be distributed over a network without being limited to media directly connected to a computer system. Examples of media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media that are managed by app stores distributing applications, sites supplying and distributing other various software, servers, and the like.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of controlling an electric moving vehicle, the method comprising:
    determining whether a user manipulation of the electric moving vehicle is present based on a presence or an absence of a user input on the electric moving vehicle; and
    applying a softlock method of shorting electrodes of an electric motor that drives at least one wheel of the electric moving vehicle without applying power to the electric motor when the user manipulation is absent, and
    applying a hardlock method of forcefully braking the electric moving vehicle by constructing a feedback loop to apply power to the electric motor, responsive to a movement of the electric moving vehicle in a state in which the softlock method has been applied.

2. The method of claim 1, wherein the softlock method includes a short brake phenomenon in which a constant force is applied to the electric motor with a counter electromotive force generated by shorting the electrodes of the electric motor.

3. The method of claim 1, wherein the braking further comprises:
    determining whether the electric moving vehicle is positioned on a flat surface or on a slope based on a gradient of the electric moving vehicle, when the user manipulation is absent;
    applying the softlock method to the electric motor when the electric moving vehicle is positioned on the flat surface; and
    applying the hardlock method to the electric motor when the electric moving vehicle is positioned on the slope.

4. The method of claim 1, wherein the hardlock method controls a driving speed of the electric motor to become zero.

5. The method of claim 1, wherein the user manipulation is determined to be present by measuring a magnitude of a force that is applied to the electric moving vehicle by a user.

6. The method of claim 1, wherein the electric moving vehicle is configured as a moving device in a structure which enables a person to be aboard.

7. A non-transitory computer-readable recording medium storing a program for controlling an electric moving vehicle, the program, when executed by a processor, performing the control method comprising:
    determining whether a user manipulation of the electric moving vehicle is present based on a presence or an absence of a user input on the electric moving vehicle; and
    applying a softlock method of shorting electrodes of an electric motor that drives at least one wheel of the electric moving vehicle without applying power to the electric motor when the user manipulation is absent, and
    applying a hardlock method of forcefully braking the electric moving vehicle by constructing a feedback loop to apply power to the electric motor, responsive to a movement of the electric moving vehicle in a state in which the softlock method has been applied.

8. A safety control apparatus of an electric moving vehicle, comprising:
    a manipulation detector configured to detect whether a user manipulation of the electric moving vehicle is present based on a presence or an absence of a user input on the electric moving vehicle; and
    a controller configured to apply a softlock method of shorting electrodes of an electric motor that drives at least one wheel of the electric moving vehicle without applying power to the electric motor when the user manipulation is absent, and apply a hardlock method of forcefully braking the electric moving vehicle by constructing a feedback loop to apply power to the electric motor, responsive to a movement of the electric moving vehicle in a state in which the softlock method has been applied.

9. The safety control apparatus of claim 8, wherein the softlock method includes a short brake phenomenon in which a constant force of brake is applied to the electric motor with a counter electromotive force generated by shorting the electrodes of the electric motor.

10. The safety control apparatus of claim 9, wherein the electric moving vehicle is configured as a moving device in a structure which enables a person to be aboard.

11. The safety control apparatus of claim 8, further comprising:
a slope detector configured to detect whether the electric moving vehicle is positioned on a flat surface or on a slope based on a gradient of the electric moving vehicle, when the user manipulation is absent,
wherein the controller is configured to apply the softlock method to the electric motor when the electric moving vehicle is positioned on the flat surface, and to apply the hardlock to method the electric motor when the electric moving vehicle is positioned on the slope.

12. The safety control apparatus of claim 11, wherein the hardlock method controls a driving speed of the electric motor to become zero.

13. The safety control apparatus of claim 8, wherein the hardlock method controls a driving speed of the electric motor to become zero.

14. The safety control apparatus of claim 8, wherein the manipulation detector is configured to determine whether the user manipulation is present by measuring a magnitude of a force that is applied to the electric moving vehicle.

15. A method of controlling an electric moving vehicle, the method comprising:
determining whether a user manipulation of the electric moving vehicle is present based on a presence or an absence of a user input on the electric moving vehicle; and
braking an electric motor that drives at least one wheel of the electric moving vehicle using a softlock method of shorting electrodes of the electric motor without applying power to the electric motor when the user manipulation is absent,
wherein the braking further comprises,
determining whether the electric moving vehicle is positioned on a flat surface or on a slope based on a gradient of the electric moving vehicle, when the user manipulation is absent;
applying the softlock method to the electric motor when the electric moving vehicle is positioned on the flat surface; and
applying a hardlock method of forcefully braking the electric motor by applying power required to brake the electric motor when the electric moving vehicle is positioned on the slope, and
wherein the hardlock method controls a driving speed of the electric motor to become zero by constructing a feedback loop.

* * * * *